US012717268B2

(12) United States Patent
Aoki et al.

(10) Patent No.: US 12,717,268 B2
(45) Date of Patent: Aug. 25, 2026

(54) IMAGE FORMING DEVICE AND IMAGE READING DEVICE HAVING A FLEXIBLE PORTION FOR AVOIDING CABLE DAMAGE

(71) Applicant: SHARP KABUSHIKI KAISHA, Sakai City (JP)

(72) Inventors: Reishi Aoki, Sakai City (JP); Hisashi Yamanaka, Sakai City (JP); Shohichi Fukutome, Sakai City (JP); Yasumasa Morimoto, Sakai City (JP); Atsuo Nakao, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 19/014,556

(22) Filed: Jan. 9, 2025

(65) Prior Publication Data

US 2025/0224693 A1 Jul. 10, 2025

(30) Foreign Application Priority Data

Jan. 10, 2024 (JP) ................................ 2024-001543

(51) Int. Cl.
*G03G 21/00* (2006.01)
*G03G 21/16* (2006.01)

(52) U.S. Cl.
CPC ................................ *G03G 21/1647* (2013.01)

(58) Field of Classification Search
USPC ........................................................ 399/110
See application file for complete search history.

(56) References Cited

FOREIGN PATENT DOCUMENTS

| | | | | |
|---|---|---|---|---|
| EP | 2369416 A1 * | 9/2011 | ............ | G03G 15/80 |
| JP | 2001-057611 A | 2/2001 | | |
| JP | 2003241443 A * | 8/2003 | | |

* cited by examiner

*Primary Examiner* — Quana Grainger
(74) *Attorney, Agent, or Firm* — ScienBiziP, P.C.

(57) ABSTRACT

An image forming device according to the disclosure includes a document feeding device provided with a cylindrical member including a through hole attached thereto, an image reading device including an insertion hole extending in a vertical direction, allowing insertion of the cylindrical member, and a cable wired along a bottom surface of the image reading device from inside the document feeding device through the through hole. A lower end portion of the insertion hole is provided with an inclined surface downwardly increasing in distance from the cylindrical member. When the document feeding device moves upward relative to the image reading device, the cylindrical member and the cable are pulled upward along the through hole, and the cable moves and is wired along the inclined surface.

12 Claims, 12 Drawing Sheets

IMAGE FORMING DEVICE AND IMAGE READING DEVICE HAVING A FLEXIBLE PORTION FOR AVOIDING CABLE DAMAGE

CROSS-REFERENCE TO RELATED APPLICATION

The present application claims priority from Japanese Application JP2024-001543, the content of which is hereby incorporated by reference into this application.

BACKGROUND OF THE INVENTION

1. Field of the Invention

The disclosure relates to an image forming device and an image reading device.

2. Description of the Related Art

Development of image forming devices has been progressing in recent years. An image forming device includes an image reading device, a document feeding device, and a cable.

The image reading device reads an image drawn on a document. The document feeding device is provided above the image reading device in an openable and closeable manner relative to the image reading device. The document feeding device feeds a document to the document reading device. The cable extends from an electronic component inside the document feeding device to an electronic component below the image reading device through a through hole of a cylindrical member extending in a longitudinal direction of the image reading device. This cable is pulled upward along the cylindrical member when the document feeding device moves upward relative to the image reading device. The cable is therefore provided with a flexible portion.

SUMMARY

In the image reading device, a right-angled corner portion is present between the cylindrical member penetrating the image reading device and a bottom surface of the image reading device. When the cable is disposed along the right-angled corner portion, the cable is strongly pressed against the right-angled corner portion when pulled upward. As a result, the cable may be damaged due to bending at a right angle.

Therefore, in some cases, the flexible portion of the cable is formed at the position where the cable changes direction, suppressing damage from cable bending. In this case, when the image reading device moves upward relative to the image feeding device, pulling the cable upward in the longitudinal direction along the through hole of the cylindrical member, the presence of this flexible portion suppresses the strong pressing of the cable against the right-angled corner portion. As a result, damage caused by the cable being pulled upward is suppressed.

However, when the flexible portion is formed in the cable between the cylindrical member penetrating the image reading device and the bottom surface of the image reading device, the flexible portion hangs down below the image reading device. Therefore, other components cannot be provided in an internal space of the image forming device below the image reading device. As a result, the internal space of the image forming device cannot be efficiently utilized.

As understood from the above, according to the image forming device described above, even if the possibility of damage to the cable can be reduced, the internal space cannot be efficiently utilized. Furthermore, a reduction in size of the image forming device is difficult.

The disclosure has been made in view of the problems described above. An object of the disclosure is to provide an image forming device and an image reading device that allow efficient utilization of an internal space while reducing the possibility of damage to a cable.

An image forming device according to an embodiment of the disclosure includes an image reading device, a document feeding device provided above the image reading device, and a cable. A cylindrical member including a through hole is attached to the document feeding device, the image reading device includes an insertion hole extending in a vertical direction, allowing insertion of the cylindrical member, the document feeding device is movable in the vertical direction relative to the image reading device by the cylindrical member moving in the vertical direction along the insertion hole, a lower end portion of the insertion hole has an inclined surface downwardly increasing in distance from the cylindrical member, and the cable is wired along a bottom surface of the image reading device from inside the document feeding device through the through hole. When the document feeding device moves upward relative to the image reading device, the cylindrical member and the cable are pulled upward along the through hole, and the cable moves and is wired along the inclined surface.

An image reading device according to an embodiment of the disclosure is attached to a document feeding device and includes an insertion hole extending in a vertical direction, allowing insertion of a cylindrical member including a through hole. The document feeding device is attachable movably in the vertical direction along the insertion hole, and a lower end portion of the insertion hole has an inclined surface downwardly increasing in distance from the cylindrical member. When the document feeding device moves upward relative to the image reading device, a cable wired along a bottom surface of the image reading device from inside the cylindrical member and the document feeding device through the through hole is pulled upward along the through hole and moves and is wired along the inclined surface.

DETAILED DESCRIPTION OF THE INVENTION

Figure 1:
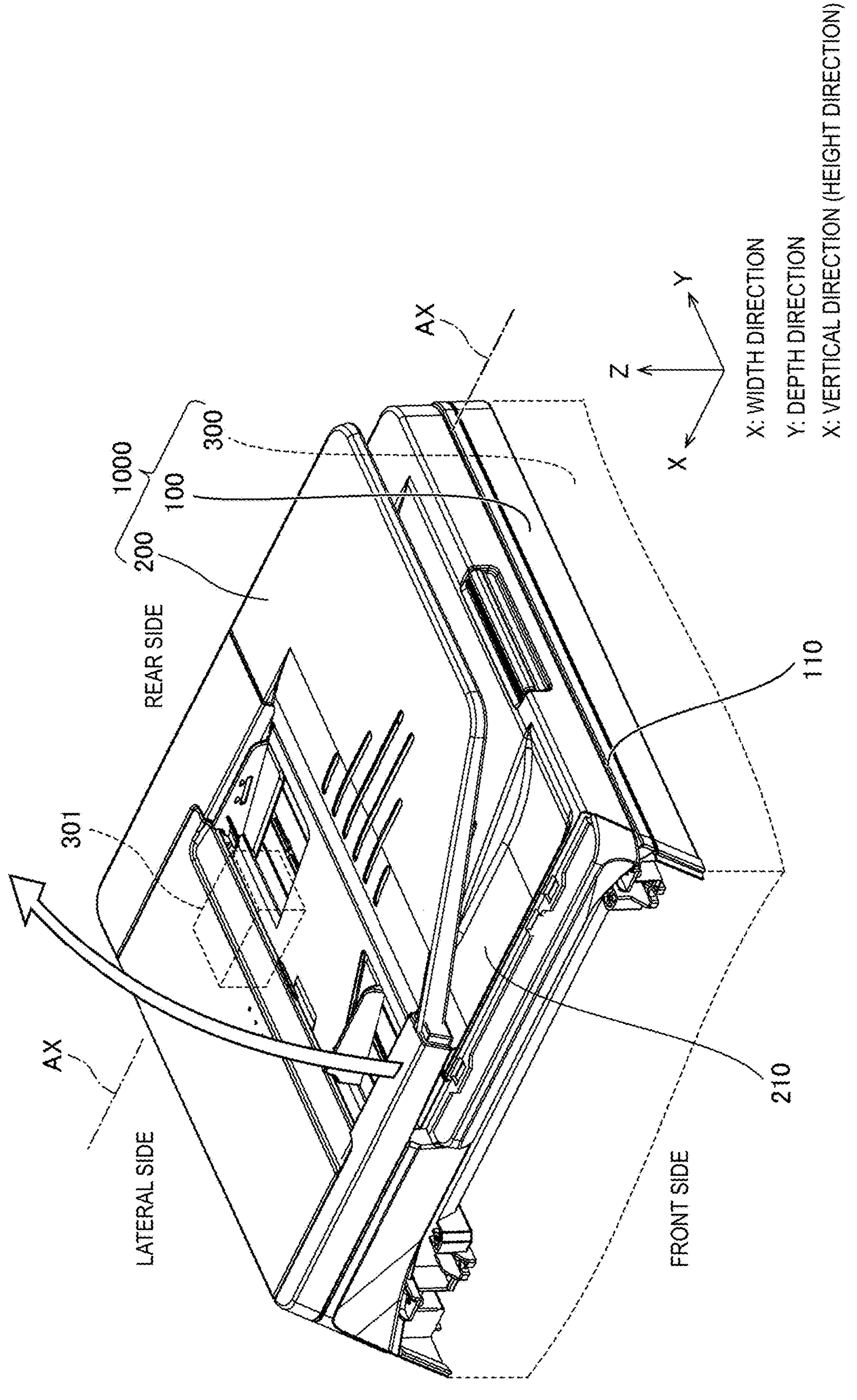
FIG. 1 is a perspective view of a document feeding device and an image reading device constituting an image forming device according to an embodiment.

An image forming device according to an embodiment of the disclosure will be described below with reference to the accompanying drawings. Note that, in the drawings, the same or equivalent elements are denoted by the same reference numerals and signs, and redundant description thereof will not be repeated.

Figure 2:
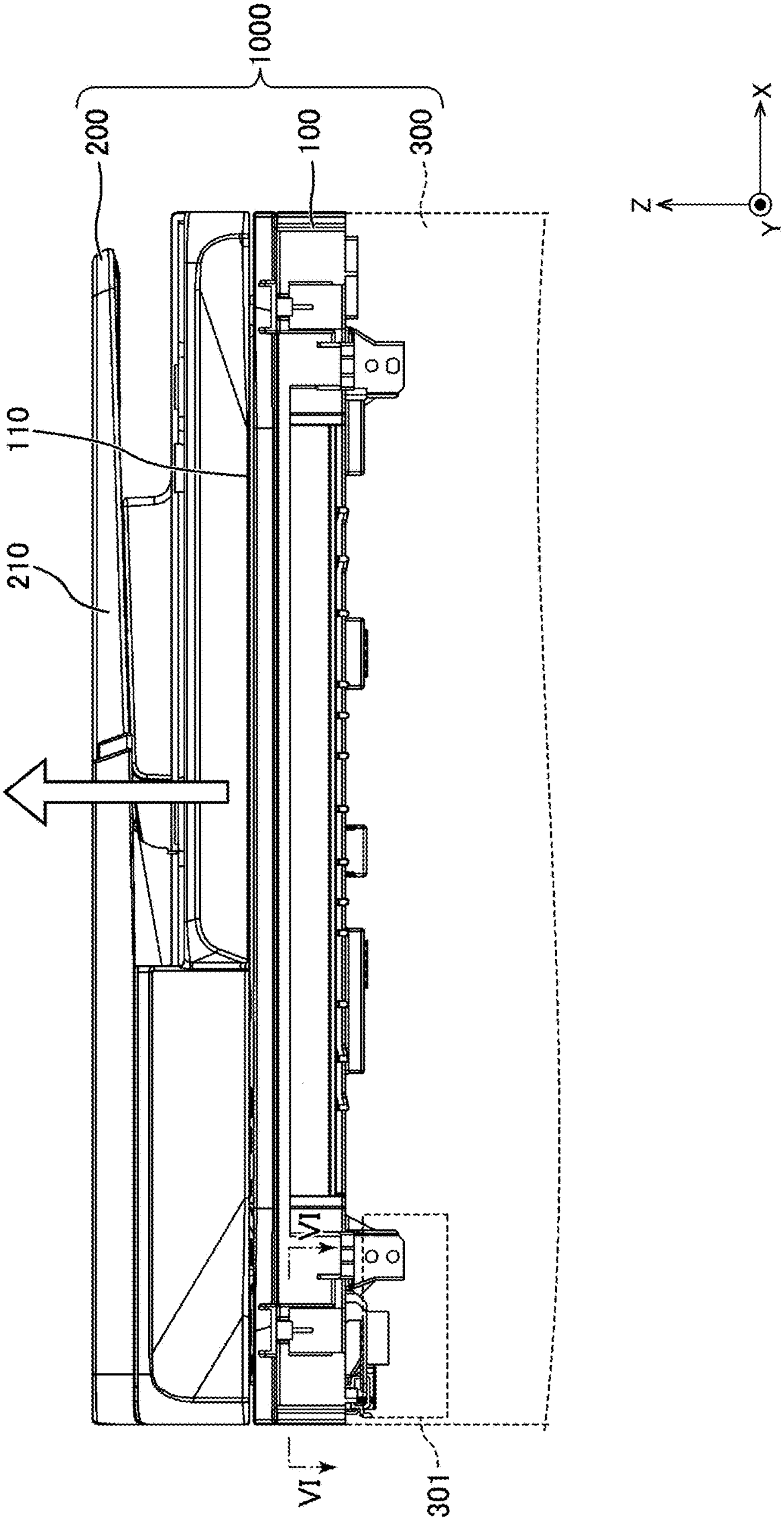
FIG. 2 is a front view of the document feeding device and the image reading device constituting the image forming device according to the embodiment.

FIG. 1 is a perspective view of a document feeding device 200 and an image reading device 100 constituting an image forming device 1000 according to the embodiment. FIG. 2 is a front view of the document feeding device 200 and the image reading device 100 constituting the image forming device 1000 according to the embodiment.

The image forming device 1000 may be, for example, a copying machine that reads an image drawn on a sheet-like medium and prints the same image as the read image on another sheet-like medium. Further, the image forming device 100 may be a printing machine that prints image data transmitted from an external terminal such as a computer on a sheet-like medium. Furthermore, the image forming device 1000 may be a multifunction peripheral in which the functions of the copying machine and the printing machine described above and functions of a facsimile and a scanner are integrated.

As illustrated in FIG. 1 and FIG. 2, the image forming device 1000 includes the image reading device 100, the document feeding device 200, and an image forming device body 300. The image reading device 100 is provided above the image forming device body 300 (outer shape only partially illustrated) of the image forming device 1000. The image reading device 100 is configured to read an image from a document. The document feeding device 200 is configured to feed a document to a document reading position of the image reading device 100 by a user. The document feeding device 200 is provided above the image reading device 100.

The image forming device 1000 forms a single-color or multi-color image on a predetermined sheet, which is a sheet-like medium, in the image forming device body 300 on the basis of image data read by the image reading device 100 or image data transmitted from an external terminal.

The image reading device 100 includes a document table 110, an image reader (not illustrated), and the like. The image reader includes a light source, a plurality of mirrors, an imaging lens, a line sensor, and the like. The image reader reads an image drawn on a document surface and generates image data corresponding to the image. An upper surface of the document table 110 is formed of a transparent material. A display operator (not illustrated) that receives an input operation by the user is provided on a front surface side of the document table 110. The display operator is, for example, an operation panel such as a touch panel and operation buttons.

The document feeding device 200 includes a document pressing cover 210. The document pressing cover 210 is attached to the document table 110 and is freely openable and closable. When the document pressing cover 210 is closed, the transparent material of the upper surface of the document table 110 is covered with the document pressing cover 210.

The image forming device body 300 includes an image former. The image former forms an image with toner supplied from a toner cartridge (not illustrated). The image former includes a photosensitive drum, a charger, an exposure unit, a development device, a cleaner unit, an intermediate transfer belt unit, a transfer roller, a fixing unit, and the like. The image forming device body 300 forms an image on a sheet fed from a sheet feeding cassette by these units and the like. The sheet on which the image is formed is emitted to a discharge tray.

As indicated by a white arrow in FIG. 1 and FIG. 2, the document feeding device 200 rotates about a virtual rotation axis AX (one dot chain line) provided on a rear surface side thereof and is opened relative to the image reading device 100. As a result, a document placement surface of the image reading device 100 is exposed. When the document feeding device 200 is closed in a state in which the document is placed in the document reading position, an image such as a character or a pattern drawn on the document can be read by the image reading device 100. An electronic circuit board 301 and the like are built inside the image forming device body 300.

Figure 3:
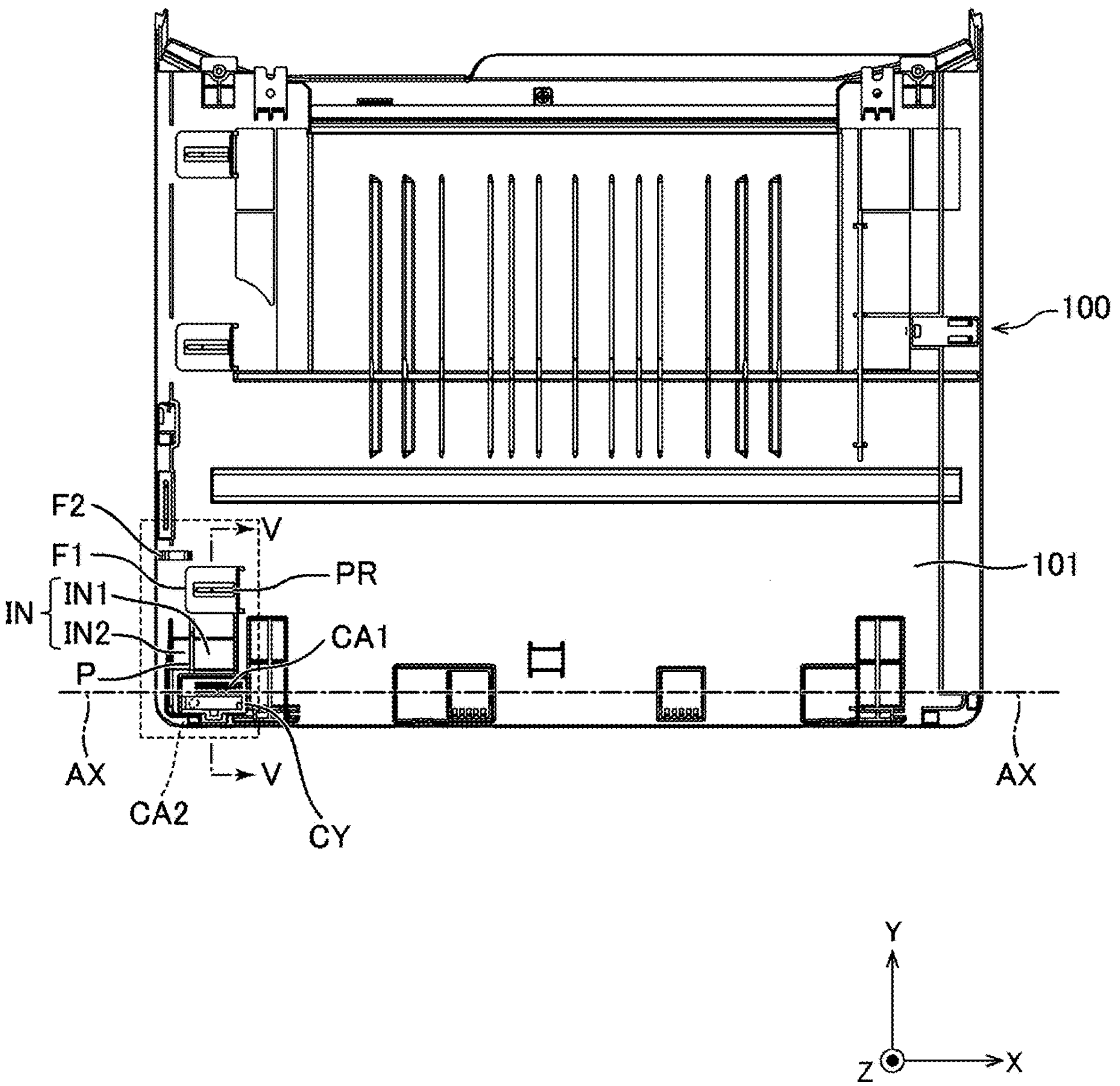
FIG. 3 is a bottom view of the image forming device according to the embodiment.
Figure 4:
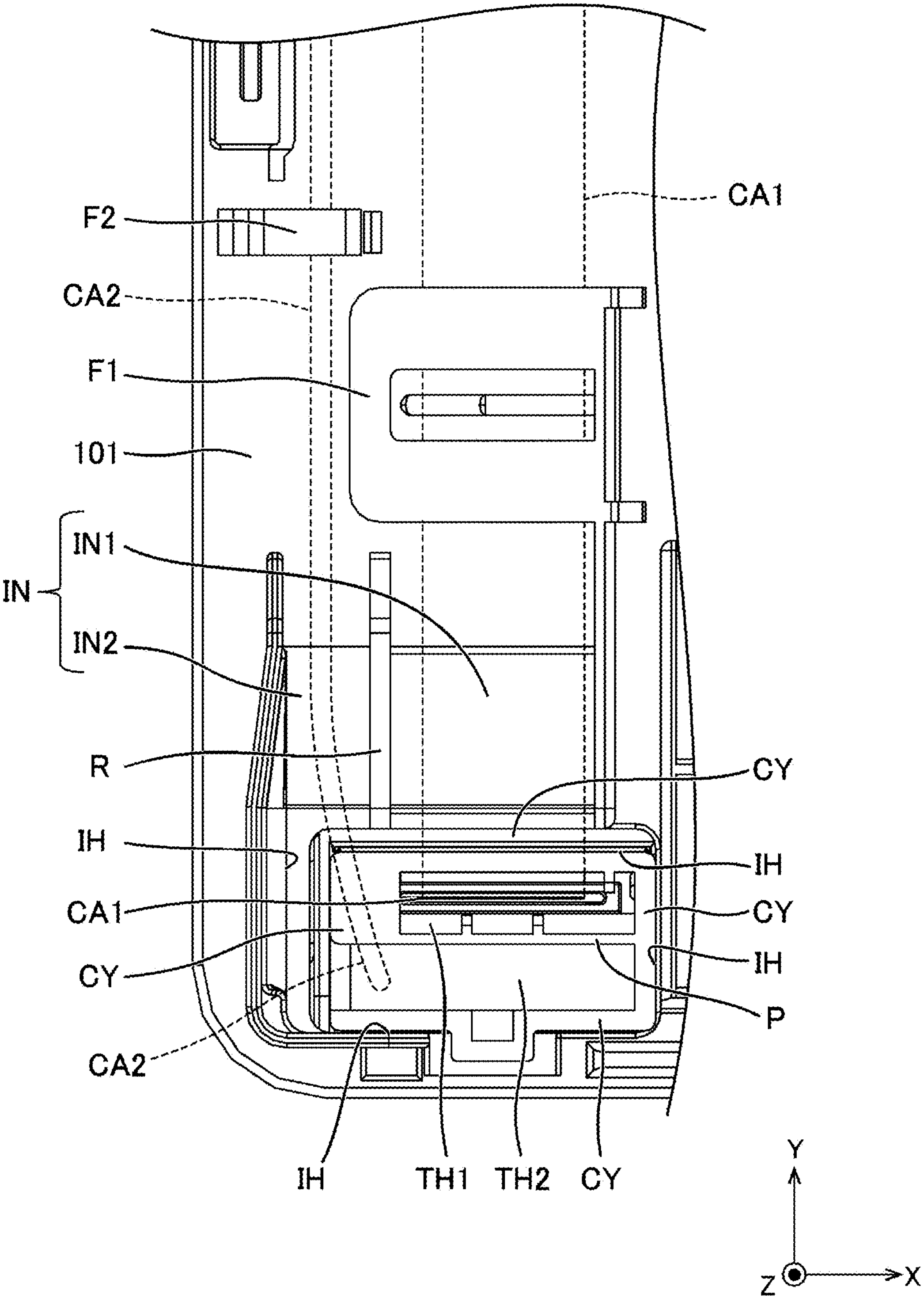
FIG. 4 is a partially enlarged bottom view of the image reading device according to the embodiment, illustrating a portion surrounded by a dashed line in FIG. 3.
Figure 5:
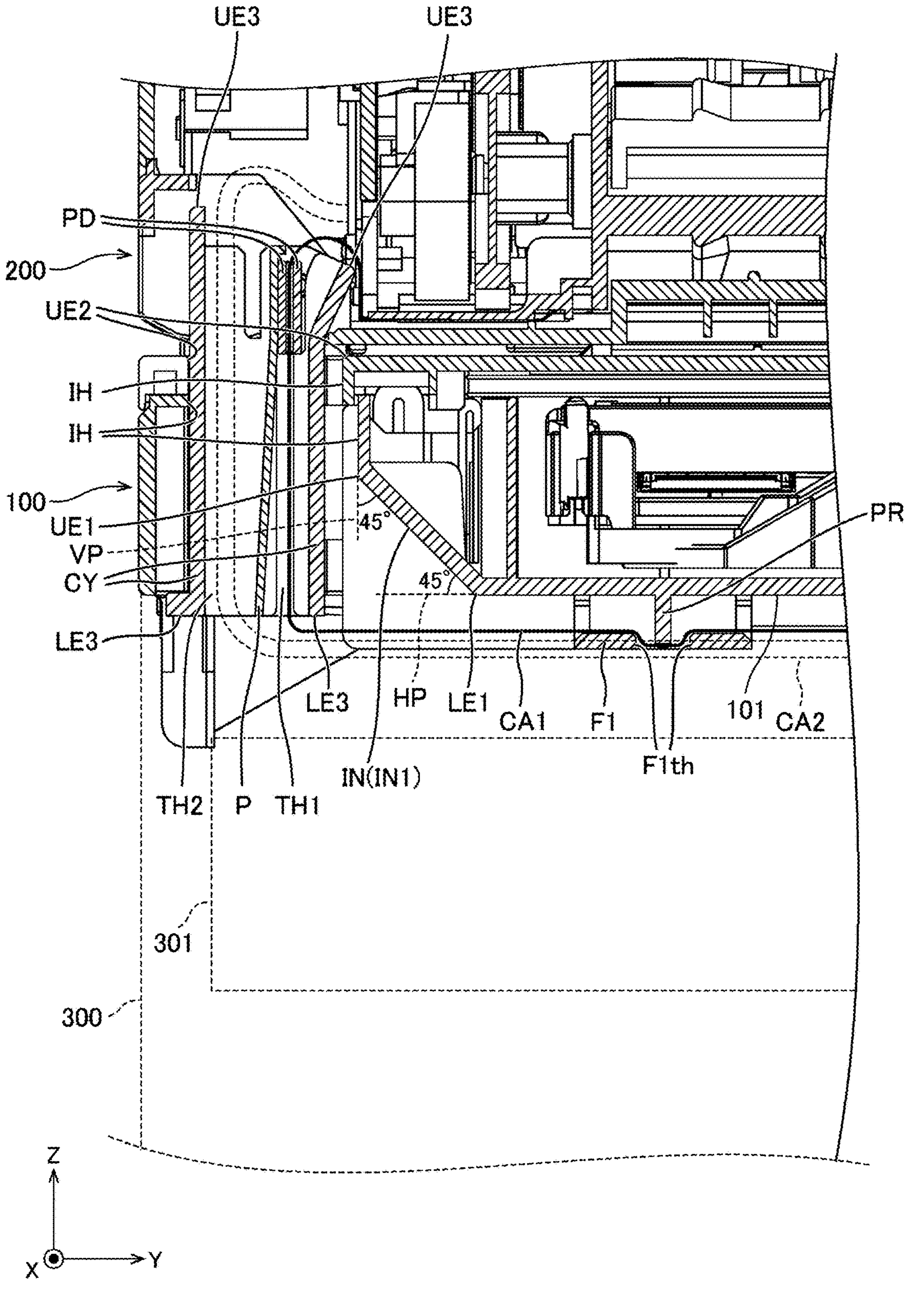
FIG. 5 is a partially enlarged longitudinal cross-sectional view of the image reading device according to the embodiment, taken along line V-V in FIG. 3.
Figure 6:
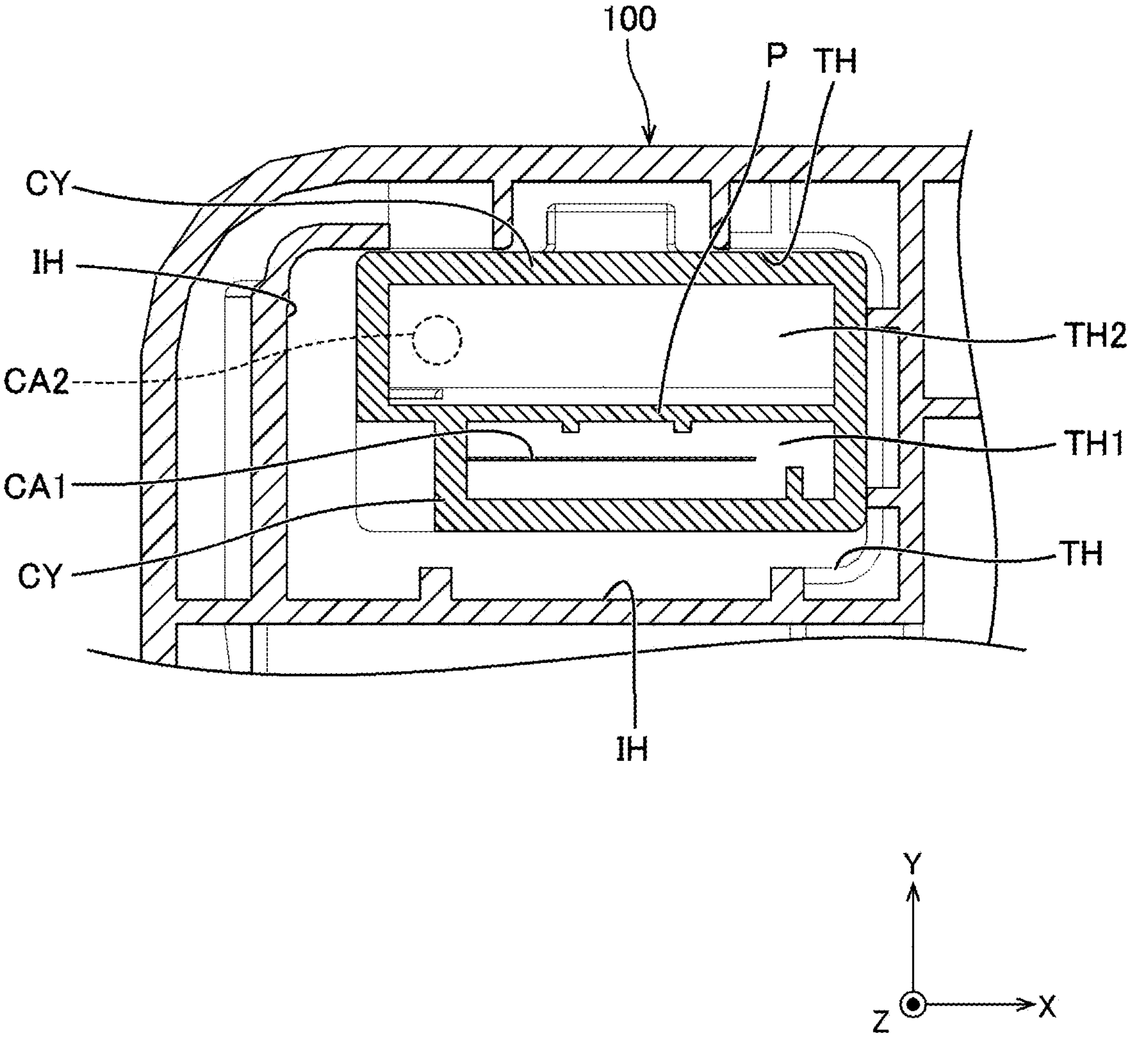
FIG. 6 is a partially enlarged lateral cross-sectional view of the image reading device according to the embodiment, taken along line VI-VI in FIG. 2.
Figure 7:
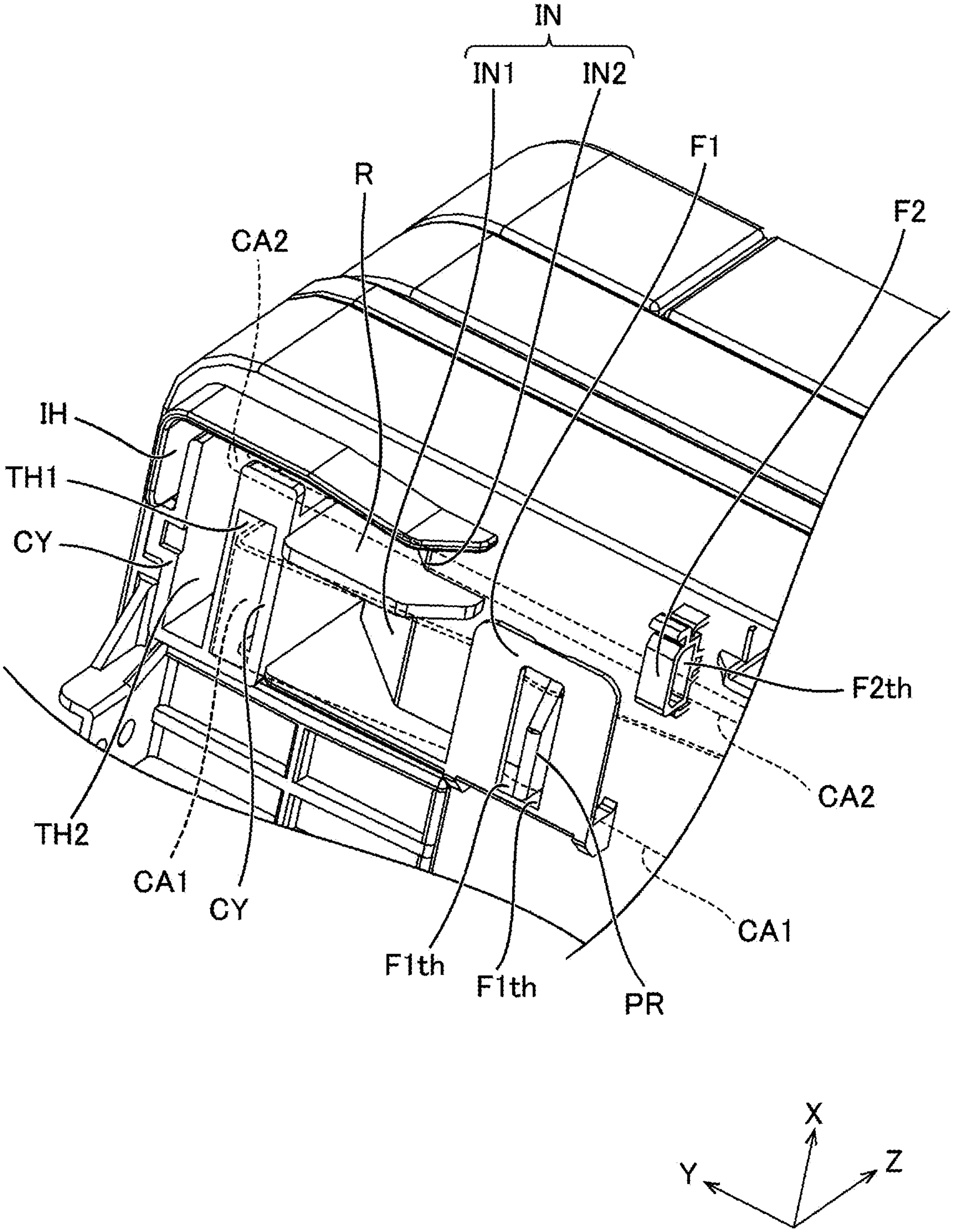
FIG. 7 is a first partially enlarged perspective view of a bottom surface side of the image reading device according to the embodiment.
Figure 8:
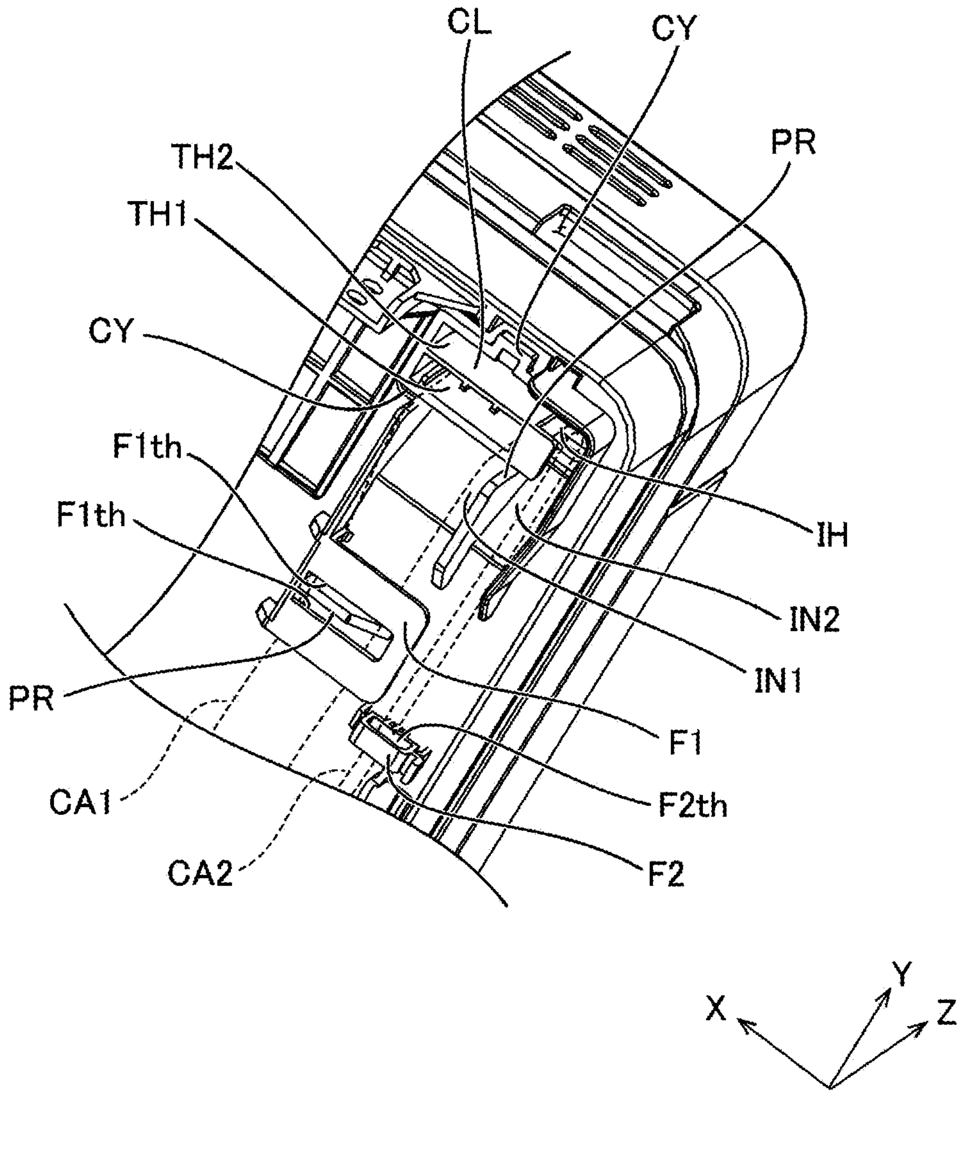
FIG. 8 is a second partially enlarged perspective view of the bottom surface side of the image reading device according to the embodiment.

FIG. 3 and FIG. 4 are a bottom view of the image reading device 100 according to the embodiment, and a partially enlarged bottom view illustrating a portion surrounded by a dashed line in FIG. 3, respectively. FIG. 5 and FIG. 6 are a partially enlarged longitudinal cross-sectional view and a partially enlarged lateral cross-sectional view of the image reading device 100 according to the embodiment, and are a cross-sectional view taken along line V-V in FIG. 3 and a cross-sectional view taken along line VI-VI in FIG. 2, respectively. FIG. 7 and FIG. 8 are first and second partially enlarged perspective views of a bottom surface 101 side of the image reading device 100 according to the embodiment, respectively.

As illustrated in FIG. 3 to FIG. 8, the image reading device 100 includes an insertion hole IH extending in a thickness direction of the image reading device 100, that is, in a vertical direction of the image reading device 100. The insertion hole IH is provided in the vicinity of the rotation axis AX. The insertion hole IH has a rectangular shape in a lateral cross section.

A cylindrical member CY that is attached to the document feeding device 200 and extends in the vertical direction along the insertion hole IH is inserted into the insertion hole IH. The cylindrical member CY includes a first through hole TH1 and a second through hole TH2. An outer shape of a lateral cross section of the cylindrical member CY forms a rectangular shape corresponding to the rectangular shape of the insertion hole IH. The cylindrical member CY includes a positioning member PD that positions a first cable CA1 in an interior thereof. Note that the cylindrical member CY is attached to the document feeding device 200 and thus, by movement of the cylindrical member CY in the vertical direction along the insertion hole IH, the document feeding device 200 and the cylindrical member CY are movable in the vertical direction relative to the image reading device 100.

Therefore, the cylindrical member CY moves in the vertical direction along the insertion hole IH. As a result, the first cable CA1 and the cylindrical member CY integrally move in the vertical direction along the insertion hole IH. Thus, the cylindrical member CY protects the first cable CA1 from damage caused by the first cable CA1, that is moving up and down, coming into contact with an inner peripheral surface of the insertion hole IH.

A lower end portion of the insertion hole IH includes an inclined surface IN increasing in distance from the cylindrical member CY downwardly of the image reading device 100. In other words, the inclined surface IN is inclined from an outer side to an inner side of the image reading device 100 downwardly of the image reading device 100. The inclined surface IN is inclined, intersecting a vertical plane VP and a horizontal plane HP at an intersection angle of 45 degrees. Accordingly, the inclined surface IN and the bottom surface 101 of the image reading device 100 intersect at an obtuse angle (135 degrees; refer to FIG. 5 and FIG. 10). Further, the inclined surface IN and an inner side surface of the insertion hole IH intersect at an obtuse angle (135 degrees; refer to FIG. 5 and FIG. 10). Accordingly, the inclined surface IN is inclined, widening a horizontal cross section (opening) of the insertion hole IH of the through hole of the image reading device 100 toward the lower side. Further, the inclined surface IN is inclined, approaching a lock F1 in a cross-sectional view (refer to FIG. 5 and FIG. 10) of the image reading device 100 from one side that is closest to the lock F1 in a bottom view (refer to FIG. 4) of the image reading device 100.

In a state in which the document transport device 200 is placed on the image reading device 100, that is, in a state in which the document transport device 200 does not move upward relative to the image reading device 100, the cylindrical member CY and the first cable CA1 are not pulled upward. In this state, a lower end LE3 of the cylindrical member CY is positioned at a height between the bottom surface 101 and a lower end of the lock F1 in a longitudinal cross-sectional view. Therefore, the first cable CA1 is wired along the bottom surface 101 from a lower side of the lower end LE3 of the cylindrical member CY to the lock F1.

The first cable CA1 extends from inside the document feeding device 200 along the bottom surface 101 of the image reading device 100 through the first through hole TH1 of the cylindrical member CY. The first cable CA1 is an electric wiring cable that electrically connects electronic components (not illustrated) in the document feeding device 200 and electronic components (not illustrated) in the image forming device body 300. As the electronic components in the document feeding device 200, the first cable CA1 and a second cable CA2 are conceivable. The first cable CA1 is a cable that transmits an image signal and is connected to a document reader (contact image sensor (CIS)) that is provided in the document feeding device 200 and reads a back surface of a document. The second cable is a cable for transmitting a drive signal and a drive voltage for driving a motor that feeds a document, and for transmitting a signal and a drive voltage from a sensor or the like that detects a fed document.

Figure 12:
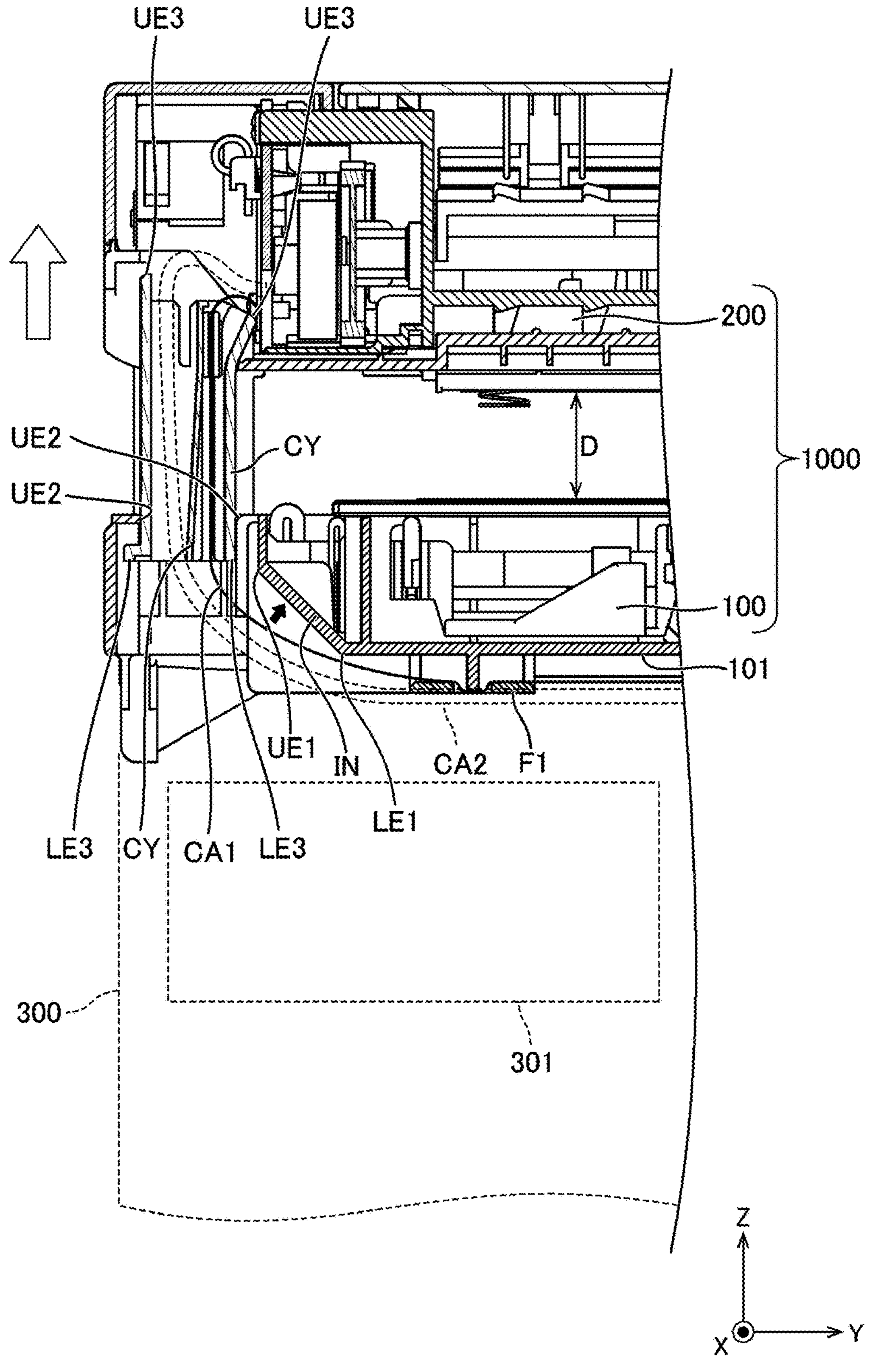
FIG. 12 is a partial cross-sectional view illustrating the state in which the document feeding device according to the embodiment is moved upward from the image reading device.

In a case in which the document feeding device 200 moves upward relative to the image reading device 100, the first cable CA1 is pulled upward along the insertion hole IH together with the cylindrical member CY and moves along the inclined surface IN (refer to FIG. 12). Accordingly, the first cable CA1 is not bent at a right angle by being brought into contact with a corner portion forming a right angle, and thus is unlikely to be damaged. Further, the first cable CA1 does not include a flexible portion hanging down into an internal space of the image forming device body 300, making it possible to effectively utilize the internal space of the image forming device body 300. That is, according to the configuration described above, it is possible to efficiently utilize the internal space of the image forming device body 300 while reducing the possibility of damage to the first cable CA1.

Note that a case in which the document feeding device 200 moves upward relative to the image reading device 100 is a case such as the following. For example, in a case in which a thick document composed of a plurality of pages, such as a book, is placed on the document table (glass) constituting an upper surface of the image reading device 100, the document feeding device 200 moves upward relative to the image reading device 100. That is, the cylindrical member of the document feeding device 200 moves upward relative to the insertion hole IH of the image reading device 100. In the above description, the image forming device 1000 in which the first cable CA1 and the cylindrical member CY move upward or move downward by the document feeding device 200 translating upward or translating downward relative to the image reading device 100 has been described. However, the image forming device 1000 in which the first cable CA1 and the cylindrical member CY rise and move upward or move downward by the document feeding device 200 rotating about a certain rotation axis relative to the image reading device 100 also exists. In the present specification, the image forming device 1000 in which the document feeding device 200 translates upward and translates downward relative to the image reading device 100 and the image forming device 1000 in which the document feeding device 200 rotates about a certain rotation axis relative to the image reading device 100 are both included as the image forming device 1000 in which the document feeding device 200 moves upward relative to the image reading device 100.

The lock F1 that locks the first cable CA1 is provided on the bottom surface 101 of the image reading device 100. The lock F1 includes a path hole F1*th* and a protrusion PR penetrating the path hole F1*th*. The first cable CA1 extends from the path hole F1*th* on one side of the protrusion PR and passes through the path hole F1*th* on the other side of the protrusion PR via a lower side of a tip end of the protrusion PR. The lock F1 locks the first cable CA1 with the first cable CA1 wired along the bottom surface 101.

According to this lock F1, it is possible to prevent the first cable CA1 from hanging down into the space in the image forming device body 300. This makes it possible to suppress restrictions on the utilization of the space in the image forming device body 300.

Further, the inclined surface IN is provided between the cylindrical member CY and the lock F1 in a bottom view. Therefore, when the first cable CA1 is pulled toward the document feeding device 200 side, the first cable CA1 can be moved, wiring the first cable CA1 along the inclined surface IN. As a result, the first cable CA1 is in contact with the corner portion having an obtuse angle, but not with the corner portion having a right angle. Accordingly, damage caused by the bending of the first cable CA1 can be suppressed.

In a state in which the document transport device 200 is placed on the image reading device 100, that is, in a state in which the document transport device 200 does not move upward relative to the image reading device 100, the cylindrical member CY and the first cable CA1 are not pulled upward. In this state, an upper end UE1 and a lower end LE1 of the inclined surface IN are positioned at a height between an upper end UE3 of the cylindrical member CY and the lower end LE3 of the cylindrical member CY. Therefore, the inclined surface IN does not protrude into the internal space of the image forming device body 300, and thus a utilization efficiency of the internal space of the image forming device body 300 is not reduced by providing the inclined surface IN.

The inclined surface IN is inclined from a position (position of reference sign UE1 in FIG. 5) between an upper end of the insertion hole H1 (position of reference sign UE2 in FIG. 5) and the lower end (position of reference sign LE1 in FIG. 5) to the bottom surface 101 of the image reading device 100, approaching the lock F1. Specifically, the inclined surface IN extends obliquely downward from, among the four sides of the rectangular shape of the insertion hole IH, the one side (position) closest to the lock F1. Therefore, the first cable CA1 bends at an obtuse angle with the lower end LE1 of the inclined surface IN closest to the lock F1 of the insertion hole IH serving as a rotation center axis, and approaches the inclined surface IN (refer to FIG. 12). A lateral cross section of the insertion hole IH has a rectangular shape, and the upper end UE1 of the inclined surface IN extends obliquely downward from one side of the rectangular shape.

The image forming device 1000 further includes the second cable CA2 (drawn by a dashed line) extending along the bottom surface 101 of the image reading device 100 from inside the document feeding device 200 through the second through hole TH2 of the cylindrical member CY. The second cable CA extends in the vertical direction in the through hole TH2 of the cylindrical member CY. In a case in which the document feeding device 200 moves upward relative to the image reading device 100, the second cable CA2 is pulled upward along the insertion hole IH together with the cylindrical member CY, moving and extending along the inclined surface IN (refer to FIG. 12). The first cable CA1 and the second cable CA2 extend substantially parallel to each other from the cylindrical member CY to the bottom surface 101 via the inclined surface IN in a bottom view.

The bottom surface 101 of the image reading device 100 includes a lock F2 that locks the second cable CA2. The lock F2 locks the second cable CA2 with the second cable CA2 wired along the bottom surface 101. The lock F2 includes a path hole F2*th*. The second cable CA2 extends, passing through the path hole F2*th*. A width of the path hole F2*th* is substantially equal to a width of the second cable CA2 or slightly smaller than the width of the second cable CA2. Therefore, even if the second cable CA2 is pulled by a friction force between the path hole F2*th* and the second cable CA2, the lock F2 suppresses movement of the second cable CA2, causing the second cable CA2 to remain at that position. The second cable CA2, similarly to the first cable CA1, is an electric wiring cable that electrically connects electronic components (not illustrated) in the document feeding device 200 and electronic components (not illustrated) in the image forming device body 300.

According to this lock F2, it is possible to prevent the second cable CA2 from hanging down into the space in the image forming device body 300. This makes it possible to suppress restrictions on the utilization of the space in the image forming device body 300. For example, it is possible to secure space for providing the electronic circuit board 301 inside the image forming device body 300.

The inclined surface IN includes a rib R that separates a first inclined surface IN1 for the first cable CA1 from a second inclined surface IN2 for the second cable CA2. This makes it possible to suppress electromagnetic mutual interference between the first cable CA1 and the second cable CA2 on the inclined surface IN. Further, physical contact between the first cable CA1 and the second cable CA2 on the inclined surface IN is prevented.

The cylindrical member CY includes a partition wall P extending and thus separating the first through hole TH1 and the second through hole TH2 from each other in a wiring direction in which the first cable CA1 and the second cable CA2 are wired. This makes it possible to suppress electromagnetic mutual interference between the first cable CA1 and the second cable CA2 in the cylindrical member CY. Further, physical contact between the first cable CA1 and the second cable CA2 in the cylindrical member CY is prevented.

The first cable CA1 is inserted into the first through hole TH1. The second cable CA2 is inserted into the second through hole TH2. The first cable CA1 is a flat cable having a lateral cross section that forms a linear shape. Further, the second cable CA2 is a round cable having a lateral cross section that forms a circular shape. Accordingly, the flat cable is inserted into the first through hole TH1. The round cable is inserted into the second through hole TH2.

The first through hole TH1 is provided at a position closer to the inclined surface IN than the second through hole TH2 in a bottom view. This makes it possible to bend the round cable with a larger radius of curvature than that of the flat cable. As a result, it is possible to effectively suppress damage to both the round cable, which is preferably bent with a larger radius of curvature, and the flat cable, which is less likely to be damaged even when bent with a smaller radius of curvature.

Figure 9:
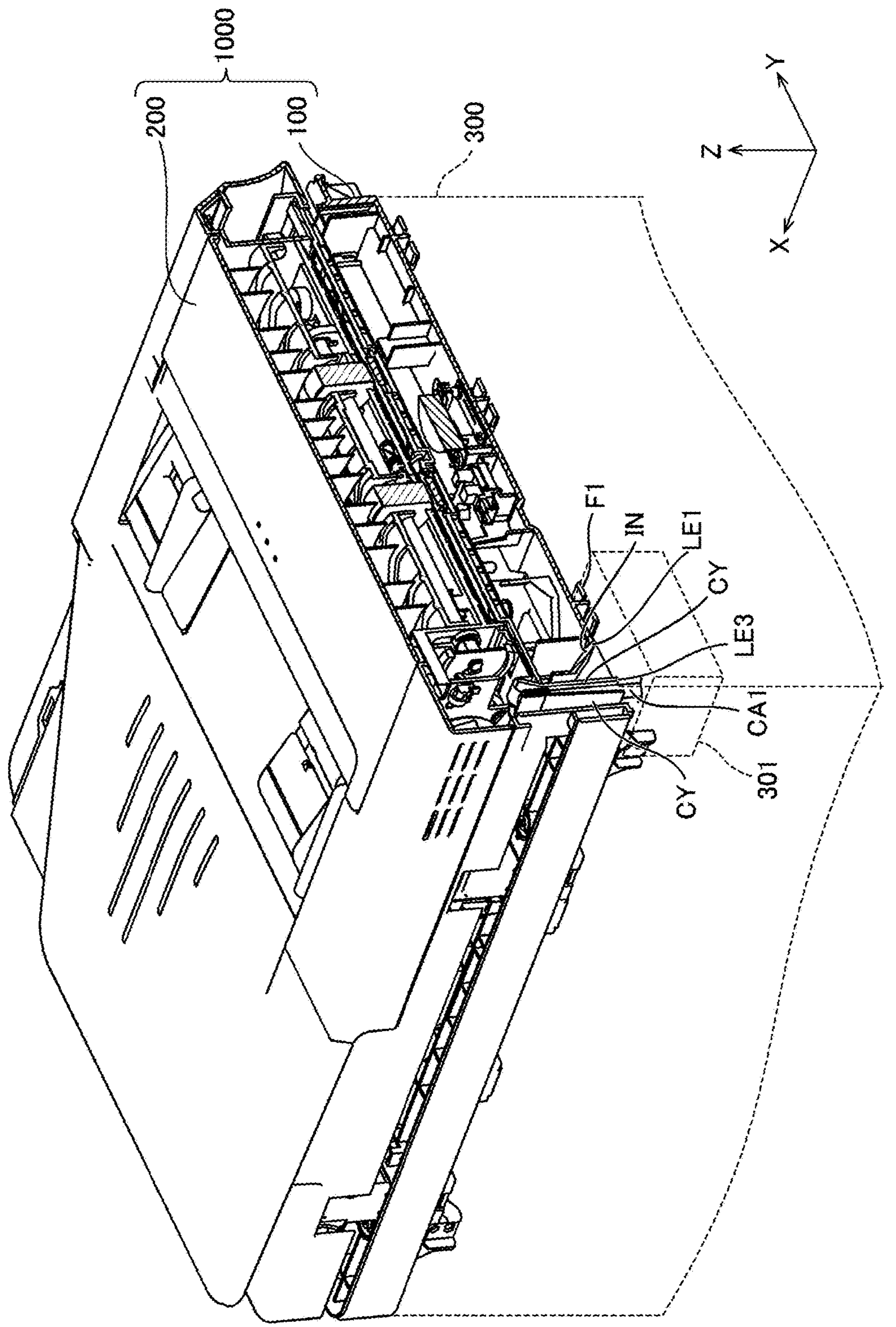
FIG. 9 is a partially cutaway perspective cross-sectional view illustrating a state immediately after the document feeding device according to the embodiment is installed in the image reading device.
Figure 10:
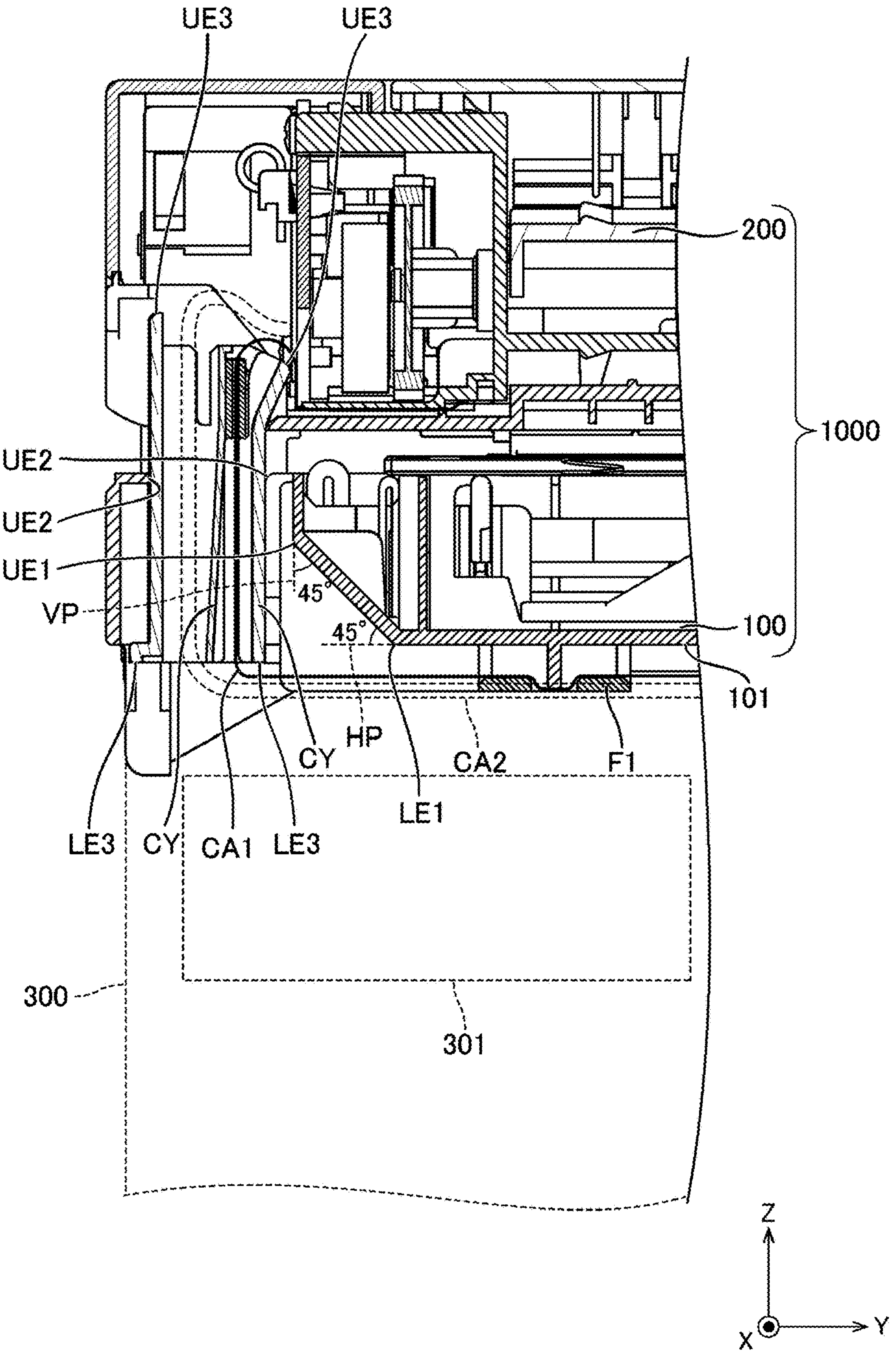
FIG. 10 is a partial cross-sectional view illustrating the state immediately after the document feeding device according to the embodiment is installed in the image reading device.

FIG. 9 and FIG. 10 are a partially cutaway perspective cross-sectional view and a partial cross-sectional view, respectively, illustrating a state immediately after the document feeding device 200 according to the embodiment is installed in the image reading device 100.

As illustrated in FIG. 9 and FIG. 10, when nothing is placed between the document feeding device 200 and the image reading device 100, the first cable CA1 and the cylindrical member CY are not pulled upward. Further, when a thin document such as a sheet is placed between the document feeding device 200 and the image reading device 100, the first cable CA1 and the cylindrical member CY are not pulled upward.

As illustrated in FIG. 9 and FIG. 10, in a state in which the document transport device 200 does not move upward relative to the image reading device 100, the cylindrical member CY and the first cable CA are not pulled upward. In this state, a lower end LE3 of the cylindrical member CY is positioned lower than the upper end UE1 of the inclined surface IN. This makes it possible to reliably maintain a state in which the first cable CA1 is not in contact with the inclined surface IN.

Further, in a state in which the document feeding device 200 does not move upward relative to the image reading device 100, the first cable CA1 is not wired along the inclined surface IN and extends along the cylindrical member CY to a height position lower than the height position of the lower end LE1 of the inclined surface IN. According to this configuration, a distance by which the first cable CA1 is pulled upward can be increased to the extent possible. Note that a case in which the document feeding device 200 does not move upward relative to the image reading device 100 is a case such as the following. For example, in a case in which the document is not a thick document including a plurality of pages such as a book, but a document that is not so thick such as one page is placed on the document table (glass), the document feeding device 200 does not substantially move upward relative to the image reading device 100. On the other hand, in a case in which no document is placed on the document table (glass), the document feeding device 200 does not move upward at all or substantially does not move upward relative to the image reading device 100.

Figure 11:
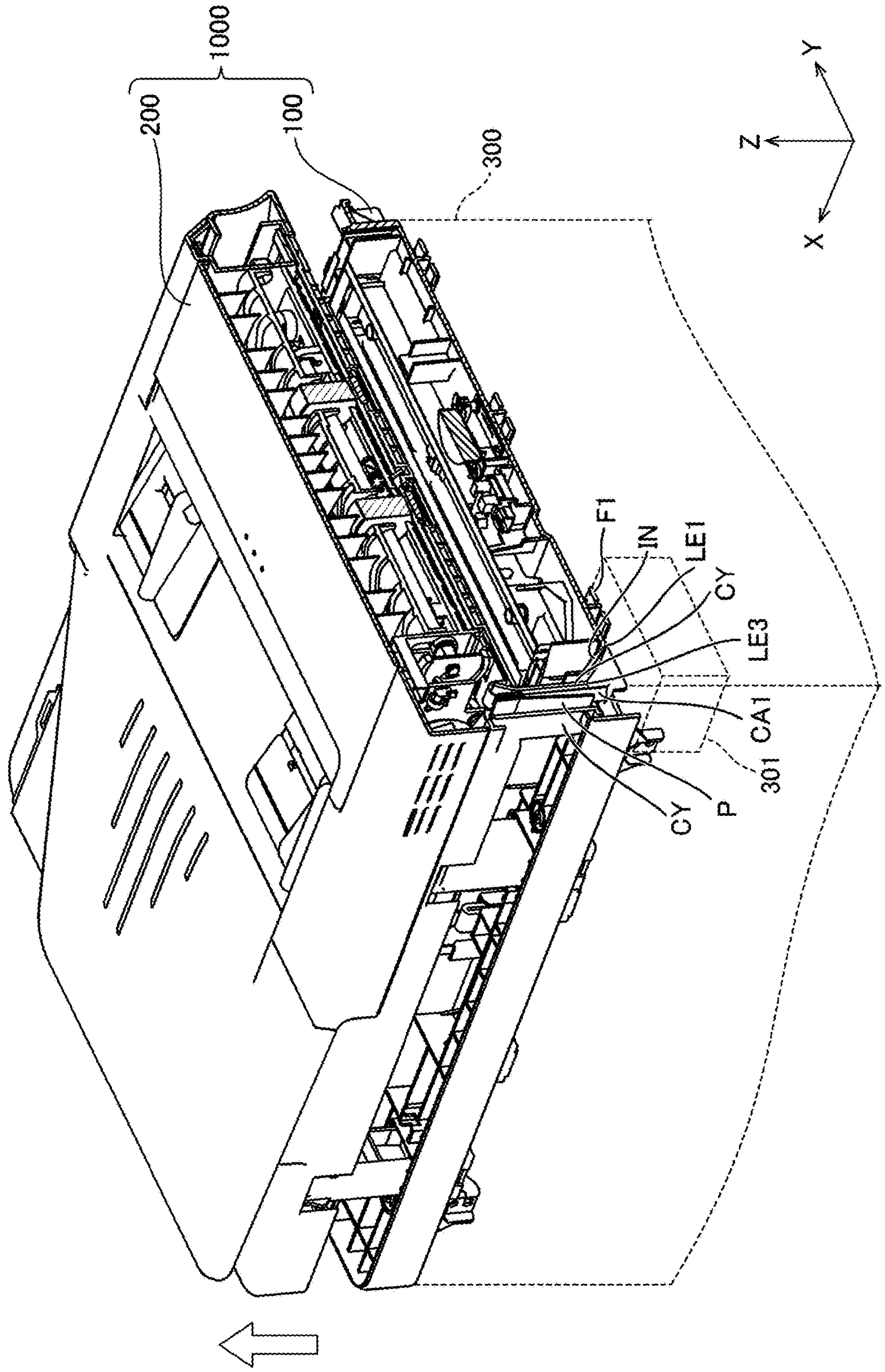
FIG. 11 is a partially cutaway perspective cross-sectional view illustrating a state in which the document feeding device according to the embodiment is moved upward from the image reading device.

FIG. 11 and FIG. 12 are a partially cutaway perspective cross-sectional view and a partial cross-sectional view, respectively, illustrating a state in which the document feeding device 200 according to the embodiment is moved upward from the image reading device 100.

As illustrated in FIG. 11 and FIG. 12, for example, when a thick document such as a book is placed between the document feeding device 200 and the image reading device 100, the document feeding device 200 moves upward relative to the image reading device 100 as indicated by a white arrow. As a result, the first cable CA1 is pulled upward. Thus, a gap D is formed between the document feeding device 200 and the image reading device 100. At this time, the first cable CA1 and the cylindrical member CY are integrated by the positioner PD and thus pulled upward together.

In a case in which the document feeding device 200 moves upward relative to the image reading device 100, the first cable CA1 and the cylindrical member CY are pulled upward. As a result, the lower end LE3 of the cylindrical member CY moves to a height position equal to or higher than that of the upper end UE1 of the inclined surface IN and equal to or lower than that of the upper end UE2 of the insertion hole IH.

Further, the first cable CA1 of the present embodiment moves, extending along the inclined surface IN. That is, the first cable CA1 approaches the inclined surface IN as indicated by a black arrow, bending at an obtuse angle with the lower end LE1 of the inclined surface LE1 closest to the lock F1 of the insertion hole IH serving as a rotation center axis. As a result, the first cable CA1 does not bend at a right angle even if the first cable CA1 bends along the corner portion having an obtuse angle that is the boundary between the bottom surface 101 and the inclined surface IN. Accordingly, damage to the first cable CA1 is suppressed. The same applies to the second cable CA2.

The invention claimed is:

1. An image forming device comprising:

an image reading device;

a document feeding device provided above the image reading device; and a cable, wherein:

a cylindrical member including a through hole is attached to the document feeding device, the image reading device includes an insertion hole extending in a vertical direction, such that the cylindrical member is allowed to be inserted into the insertion hole, the document feeding device is movable in the vertical direction, relative to the image reading device, by having the cylindrical member move in the vertical direction along the insertion hole, a lower end portion of the insertion hole has an inclined surface inclining away from the cylindrical member in a downward direction, the cable is wired along a bottom surface of the image reading device from inside the document feeding device through the through hole, when the document feeding device moves upward relative to the image reading device, the cylindrical member and the cable are pulled upward along the through hole, and the cable moves, and is wired, along the inclined surface, and the inclined surface is further inclined from an outer side to an inner side of the image reading device in the downward direction.

2. An image forming device comprising:

an image reading device;

a document feeding device provided above the image reading device; and a cable, wherein:

a cylindrical member including a through hole is attached to the document feeding device, the image reading device includes an insertion hole extending in a vertical direction, such that the cylindrical member is allowed to be inserted into the insertion hole, the document feeding device is movable in the vertical direction, relative to the image reading device, by having the cylindrical member move in the vertical direction along the insertion hole, a lower end portion of the insertion hole has an inclined surface extending away from the cylindrical member in a downward direction, the cable is wired along a bottom surface of the image reading device from inside the document feeding device through the through hole, and when the document feeding device moves upward relative to the image reading device, the cylindrical member and the cable are pulled upward along the through hole, and the cable moves, and is wired, along the inclined surface, and the bottom surface of the image reading device is provided with a lock that locks the cable wired along the bottom surface.

3. The image forming device according to claim 2, wherein the inclined surface is provided between the cylindrical member and the lock in a bottom view.

4. The image forming device according to claim 1, wherein, when the document feeding device does not move upward relative to the image reading device, the cable and the cylindrical member are not pulled upward along the through hole, and an upper end of the inclined surface is positioned at a height between an upper end of the cylindrical member and a lower end of the cylindrical member in a longitudinal cross-sectional view.

5. The image forming device according to claim 1, wherein, when the document feeding device does not move upward relative to the image reading device, the cable and the cylindrical member are not pulled upward along the through hole, and a lower end of the cylindrical member is positioned lower than an upper end of the inclined surface.

6. The image forming device according to claim 5, wherein, when the document feeding device moves upward relative to the image reading device, the cable and the cylindrical member are pulled upward along the through hole, such that the lower end of the cylindrical member moves to a height position equal to, or higher than, a height position of the upper end of the inclined surface and equal to, or lower than, a height position of an upper end of the through hole.

7. The image forming device according to claim 1, wherein, when the document feeding device does not move upward relative to the image reading device:

the cable and the cylindrical member are not pulled upward along the through hole, and the cable is not wired along the inclined surface and is wired along the cylindrical member to a height position lower than a height position of a lower end of the inclined surface.

8. The image forming device according to claim 2, wherein the inclined surface is inclined and approaches the lock from a position between an upper end and a lower end of the insertion hole to the bottom surface of the image reading device.

9. The image forming device according to claim 1, further comprising:

another cable wired along the bottom surface of the image reading device from inside the document feeding device through the through hole of the cylindrical member, wherein:

when the document feeding device moves upward relative to the image reading device, the cylindrical member and the other cable are pulled upward along the through hole, and the other cable moves, and is wired, along the inclined surface, and the inclined surface includes a rib separating a first inclined surface for the cable from a second inclined surface for the other cable.

10. The image forming device according to claim 1, wherein the cylindrical member includes a partition wall extending along a wiring direction in which the cable is wired in the through hole, such that the through hole is partitioned into a first through hole and a second through hole.

11. The image forming device according to claim 10, wherein:

the cable is a flat cable, the other cable is a round cable, the flat cable is inserted into the first through hole, the round cable is inserted into the second through hole, and the first through hole is provided at a position closer to the inclined surface than the second through hole.

12. An image reading device attached to a document feeding device, the image reading device comprising:

an insertion hole extending in a vertical direction, such that a cylindrical member including a through hole is allowed to be inserted into the insertion hole, wherein:

the document feeding device is attachable movably in the vertical direction along the insertion hole, a lower end portion of the insertion hole has an inclined surface inclining away from the cylindrical member in a downward direction, when the document feeding device moves upward relative to the image reading device, a cable, wired along a bottom surface of the image reading device from inside the cylindrical member and the document feeding device through the through hole, is pulled upward along the through hole, moves, and is wired, along the inclined surface, and the inclined surface is further inclined from an outer side to an inner side of the image reading device in the downward direction.

* * * * *